Jan. 11, 1944.        D. C. STOCKBARGER ET AL        2,339,204
                      WEB ALIGNMENT DETECTOR
            Original Filed May 5, 1937        7 Sheets-Sheet 1
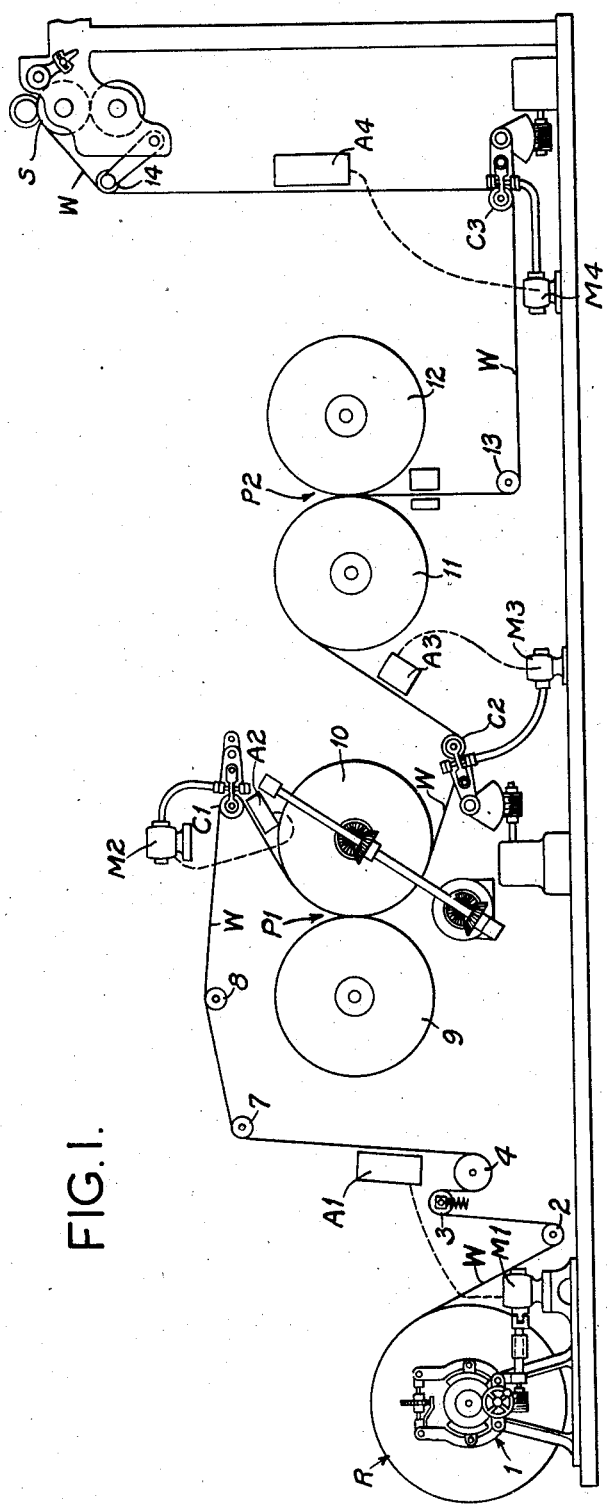
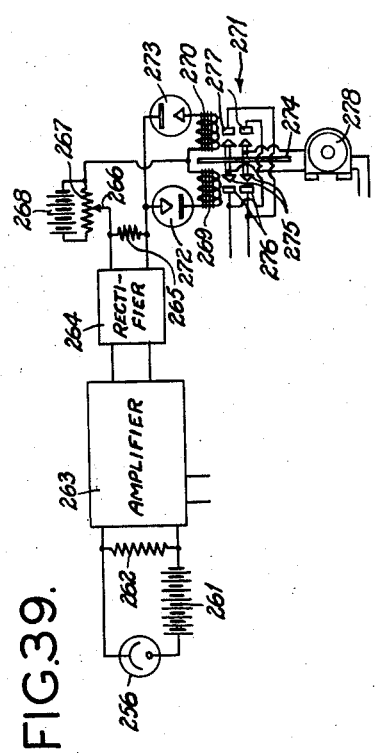
Donald C. Stockbarger,
John L. Jones,
        Inventors.
Haynes and Koenig
        Attorneys.

Jan. 11, 1944.  D. C. STOCKBARGER ET AL  2,339,204
WEB ALIGNMENT DETECTOR
Original Filed May 5, 1937   7 Sheets-Sheet 3

Donald C. Stockbarger,
John L. Jones,
Inventors.
Haynes and Koenig,
Attorneys.

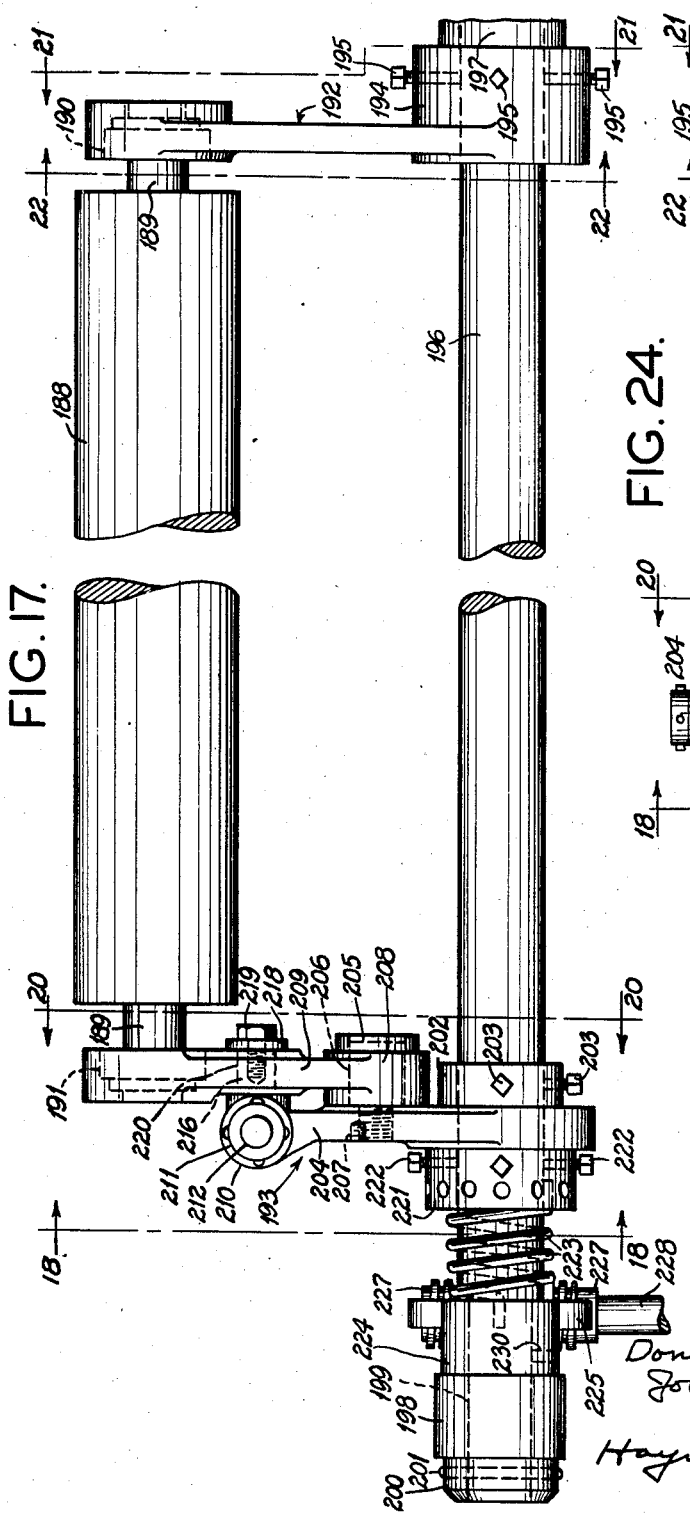
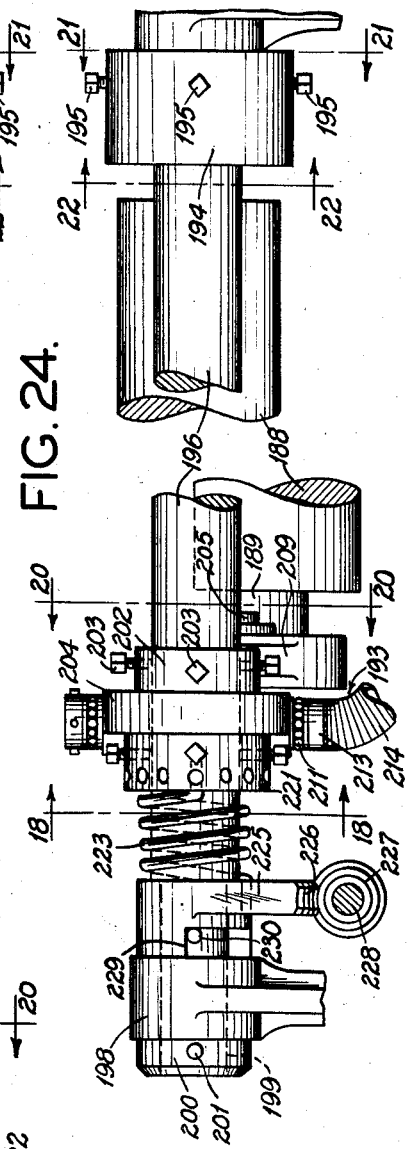

Jan. 11, 1944. D. C. STOCKBARGER ET AL 2,339,204
WEB ALIGNMENT DETECTOR
Original Filed May 5, 1937   7 Sheets-Sheet 6
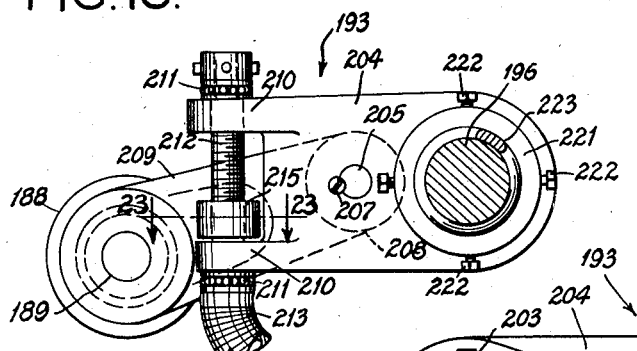
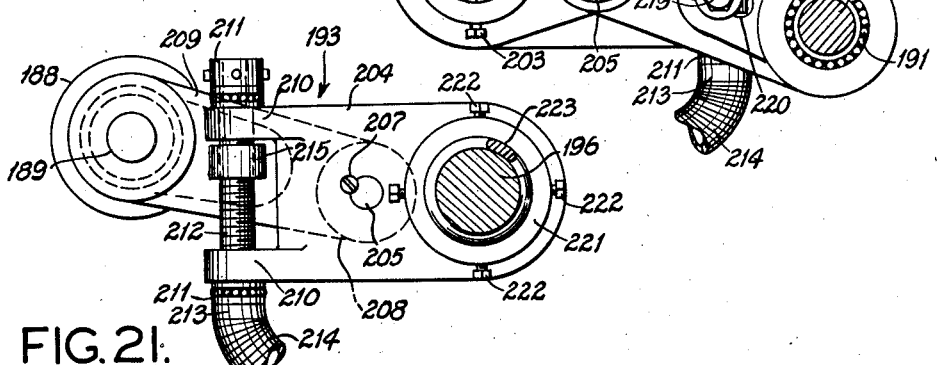
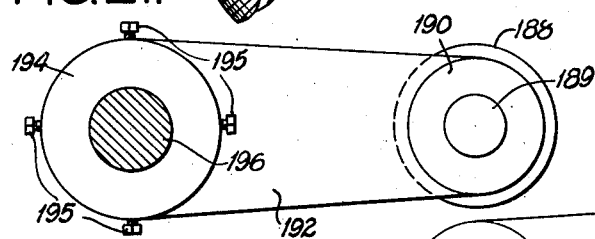
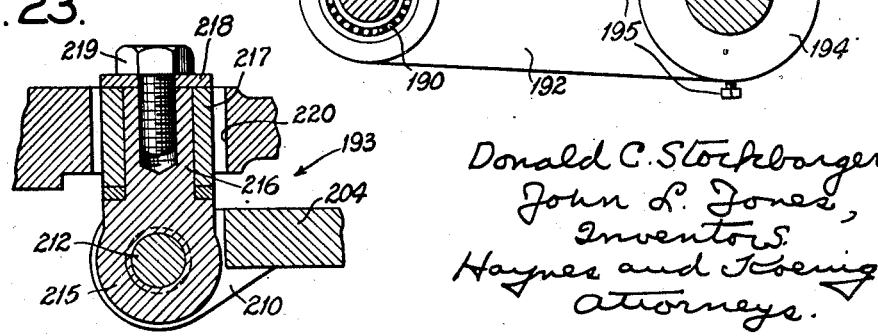
Donald C. Stockbarger,
John L. Jones,
Inventors.
Haynes and Koenig,
Attorneys.

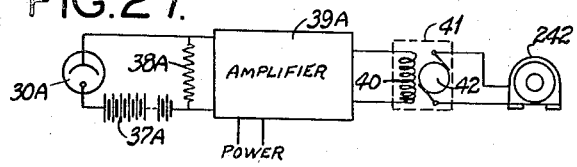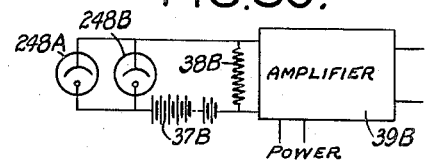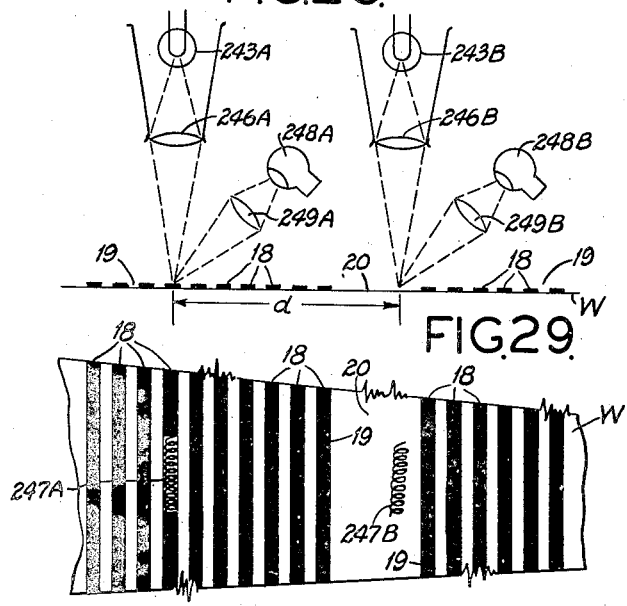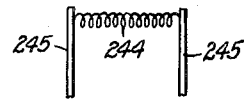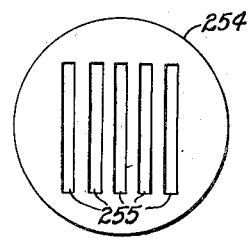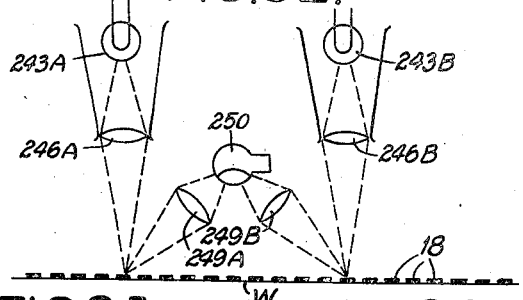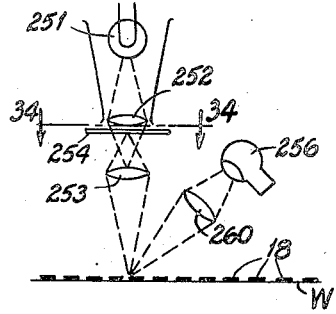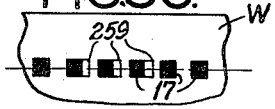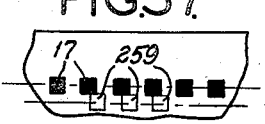

Patented Jan. 11, 1944

2,339,204

UNITED STATES PATENT OFFICE 2,339,204

WEB ALIGNMENT DETECTOR

Donald C. Stockbarger, Belmont, and John L. Jones, North Billerica, Mass., assignors to Stockton Profile Gauge Corporation, Lowell, Mass., a corporation of Massachusetts Original application May 5, 1937, Serial No. 140,996, now Patent No. 2,220,736, dated November 5, 1940. Divided and this application October 7, 1940, Serial No. 360,094

6 claims. (Cl. 250—41.5)

This invention relates to web alignment detectors, and particularly to detectors for webs composed of material such as paper and the like passing through a machine performing an operation such as, for example, a printing press.

This invention is a division of the invention described in the application of Donald C. Stockbarger and John L. Jones, Serial No. 140,996, filed May 5, 1937, for Apparatus for detecting web alignment, eventuated into Patent 2,220,736, dated November 5, 1940.

Among the several objects of the invention may be noted:

The provision of apparatus for detecting web alignment which interposes no mechanical obstruction to the movement of the web;

The provision of apparatus for detecting web alignment which is capable of accurate operation at web speeds up to and exceeding six hundred feet per minute, as encountered in modern high-speed rotary presses;

The provision of apparatus for detecting web alignment which is substantially free of inertial forces, whereby misalignment may be more speedily corrected;

The provision of apparatus for detecting web alignment which operates upon actuation by predetermined index positions, or abnormalities thereof, of periodically repeating patterns upon the web, which patterns may comprise either printed regions normally contained on the web, or specially provided patterns, or both;

The provision of apparatus for detecting web alignment which includes a detection of an abnormality in the position of the web, a determination of the direction of such abnormality, and the application of a correcting influence properly suited to the said direction of the abnormality;

The provision of web alignment detectors operating upon optical principles, wherein detection is made of the normality or abnormality in position of a periodically repeating pattern upon the web;

The provision of web alignment detectors including photoelectric observing means for abnormalities in alignment of the web;

The provision of apparatus of the class described which is relatively simple and economical in construction and in operation.

Other objects will be in part obvious and in part pointed out hereinafter.

The invention accordingly comprises the elements and combinations of elements, and features of construction and operation and arrangements of parts, which will be exemplified in the structures hereinafter described, and the scope of the application of which will be indicated in the following claims.

Referring now more particularly to the accompanying drawings, in which are illustrated several of the various possible embodiments of the invention, Fig. 1 is a diagrammatic side elevation of a printing press showing alignment controls in accordance with the present invention;

Fig. 17 is a top plan view of a preferred compensating roll;

Fig. 18 is a cross section taken substantially along line 18—18 of Fig. 17, showing an outside elevation of a dual control arm;

Fig. 19 is a cross section similar to Fig. 18, but showing an alternative position of a control arm;

Fig. 20 is a cross section taken substantially along line 20—20 of Fig. 17, showing the inside elevation of said dual control arm;

Fig. 21 is a cross section taken substantially along line 21—21 of Fig. 17, showing the outside elevation of a simple control arm;

Fig. 22 is a cross section taken substantially along line 22—22 of Fig. 17, showing the inside elevation of said simple control arm;

Fig. 23 is a cross section taken on line 23—23 of Fig. 18, showing a pivot pin and drive nut;

Fig. 24 is a back elevation of the compensating roll of Fig. 17;

Fig. 27 is an electrical circuit of an alternative form of lateral alignment control;

Fig. 28 is a diagram of an optical system which may be used as an alternative to a portion of the optical system illustrated in Fig. 8;

Fig. 29 is a fragmentary plan view of the web used in connection with the optical system of Fig. 28;

Fig. 30 is an electrical circuit for use with the embodiment shown in Fig. 28;

Fig. 31 is a diagrammatic side elevation of a lamp filament and support;

Fig. 32 is an optical diagram showing an alternative to the Fig. 28 embodiment;

Fig. 33 is an optical diagram of still another alternative to the Fig. 28 embodiment;

Fig. 34 is a cross section taken substantially along line 34—34 of Fig. 33, showing a mask;

Fig. 35 is a plan view of another mask useful in connection with the Fig. 33 optical system;

Fig. 36 is a plan view of the image of the mask of Fig. 35 as projected on a web, the web being properly aligned laterally;

Fig. 37 is a view similar to Fig. 36, except that the web is laterally misaligned in one direction;

Fig. 38 is a view similar to Figs. 36 and 37, except that the web is laterally misaligned in the other direction; and, Fig. 39 is a diagram of an electrical circuit for the lateral alignment control using the mask of Fig. 33.

Similar reference characters indicate corresponding parts throughout the several views of the drawings.

Figure 2:
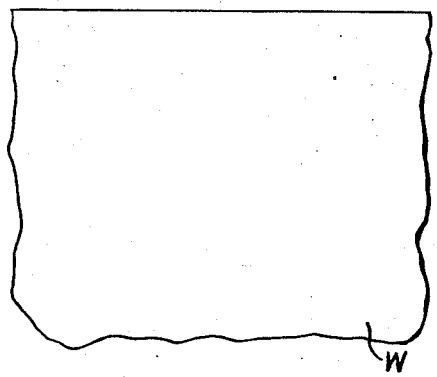
Figures 2 through 7 are fragmentary plan views of typical webs of paper in various conditions hereinafter to be described.

With modern high-speed rotary printing presses, the problem of control of the moving paper or other web upon which the printing is being done is a difficult one.

Attempts have heretofore been made to control the position and location of the moving web through a printing press by means of mechanical feelers and like elements which engage the moving web itself. However, the easy tearing and breaking character of paper, which is the material of which the web is usually composed, makes such control methods in general unsatisfactory, since the feelers or like mechanism all too easily tear the web. This is particularly true when the web travels at the high speeds encountered in modern rotary presses, such as six hundred feet per minute. Further, the inertia of such mechanical web control means makes it substantially impossible for them to respond with sufficient speed to abnormalities in position of the web, and corrective movements, if they are applied at all, are applied only after such a delay that considerable wastage of web material is brought about in the meanwhile.

Optical methods of web control are in general more satisfactory, since they depend upon light phenomena, which have no inertia, and are thus responsive with greater speed to an abnormality in the web position. Further, the light rays used for detection of abnormalities in position of the web offer no mechanical or other obstruction to the movement of the web, and cannot tear or otherwise disfigure the web, as is the case with mechanical feelers and the like.

However, up to the present time, no optical web control mechanisms have been provided which are capable of controlling the moving web with desired accuracy, particularly at relatively high press speeds. The present invention is, so far as we know, the first provision of such optical control systems.

The present invention, in its broader aspects, is applicable not only to the alignment of webs passing through printing presses, but to webs passing through machinery which performs operations on the web in accordance with certain dimensional characteristics thereof, such as cutters, trimmers, folders, and the like, as will be pointed out in greater detail hereinafter. However, in order to simplify the explanation of the present invention, it will be described principally in its application to printing presses.

There is accordingly shown in Fig. 1, in diagrammatic form, a multiple-press, rotary printing press, which is equipped with the alignment control features of the present invention. Referring more particularly to Fig. 1, index character R indicates a paper or web supply roll, that is supported in a cradle device indicated generally at numeral 1. Proceeding from the roll R is a web W of paper, on which the printing is to be accomplished. From the roll R the web W passes around an idler roll 2, a tensioning roll 3, and idler rolls 4, 7 and 8, to a compensating roll C1 hereinafter more fully to be described. From the compensating roll C1 the web W passes between the two cylinders 9 and 10 of a first press P1, receiving therein a desired impression. From the press P1, the web W passes around a second compensating roll C2, and thence between the cylinders 11 and 12 of a second press P2. From the second press P2 the web W passes around an idler roll 13, a third compensating roll C3, an idler roll 14, and into a slitter mechanism indicated generally by letter S. For present purposes, the operations on the web will be considered to have terminated when the web is delivered to the slitter S, although, as will be described more fully hereinafter, the slitter S is itself provided with alignment controls in accordance with the present invention.

Index character A1 indicates, in Fig. 1, a diagrammatic lateral alignment detection device, which, operating through a motor M1, drives a roll-shifting device indicated generally by numeral 15 (to be described in greater particular hereinafter) in the cradle 1 supporting the roll R. Lateral alignment detector A1, together with its motor M1 and device 15, serves to perform a first, relative lateral guiding operation on the web W, in order to provide that the web W, as it passes to the idler rolls 7 and 8, is substantially laterally aligned for the press P1. However, in order that the web W may be accurately aligned, laterally, before it passes into the press P1, a second lateral web alignment detector A2 is provided. This detector A2, operating through a motor M2, controls the compensating roll C1, in a manner hereinafter to be described, so that if the web W is at all displaced from its desired lateral course as it passes the detector A2, a correction is substantially immediately applied by the compensating roll C1 in order to correct the travel of the web W. The web W is thus delivered to the press P1 in perfect lateral alignment. Since, ordinarily, no printed matter appears on the web W prior to its passage through the first press P1 (with the possible exception of certain guiding marks hereinafter to be described), longitudinal alignment of the web W is not ordinarily considered to be necessary prior to the first press P1.

When the web W passes from the press P1, however, it contains thereon a certain amount of printed matter, and it is necessary that the second press P2 deliver its impression on the web W in a precise lateral arrangement with respect to the matter printed on the web by press P1. For this purpose, a lateral alignment detector A3 is provided in juxtaposition to the web W between the presses P1 and P2. The lateral alignment detector A3 controls a motor M3, which in turn operates on the compensating roll C2.

From the press P2, the now completely printed web W passes to the slitting mechanism indicated by letter S. It will readily be seen that it is necessary that the slitting mechanism be precisely positioned laterally with respect to the printed matter on the web. Hence a lateral alignment detector A4 is provided, and this detector, acting through a motor M4, controls the operation of compensating roll C3 in such a manner that the web W reaches the slitter mechanism S in proper lateral position.

The foregoing cursory description of Fig. 1 indicates the various controls employed in the preferred embodiments of the present invention, and the general manner in which they operate to assure the proper guiding of the web through the multiple presses. The scheme of operation, it will be seen, is to detect an abnormality in the position of the web at any desired location, and then automatically to apply a correcting influence such that abnormality is corrected in the minimum possible time. In other words, while an abnormally positioned region of the web may record itself on an alignment detector as such, and while that particular abnormally position region will then go on and pass through the press in abnormal position, such abnormality in the meanwhile will have set the correcting mechanism to work, so that before many feet of web have passed the detector the abnormality has been corrected.

Basically, the system or method provided by the present invention for the purpose of detecting the lateral alignment of a moving web comprises optically detecting whether or not a predetermined part of the web is in a predetermined index position, either constantly or intermittently at predetermined times relative to the beginning of the cycle in which the detection takes place, determining whether any displacement of the predetermined part of the web from the predetermined index position is positive or negative such as to the right or to the left, and producing an electrical signal or controlling the flow of electric current in the circuit of a correcting means in accordance with the algebraic sign of the displacement if there is a displacement at the time of the detection. The alignment of the web may then be corrected with apparatus of known type, outside the scope of the present invention, in accordance with the signal developed by the detector. The above described detection may be repeated either constantly or during each successive cycle or during a majority of cycles at predetermined equal relative times after the beginnings of the respective cycles in which detection occurs. Web alignment correction may be made each time detection occurs if correction is needed.

The "part of the web" inspected for alignment detection purposes preferably comprises a pattern of periodically repeating character on one or the other or both surfaces of the web. A lateral alignment detector is hereinafter described for inspecting such a periodically repeating pattern.

The periodically repeating pattern on the web may be an art design or printed words, for example, and the predetermined part of the pattern at which detection occurs may be an edge of an art figure or the top of a line of printed words, for example. The phrase "periodically repeating pattern" is also used to include a continuous pattern such as a continuous line running parallel to an edge of the web or such as an edge of the web itself. The periodically repeating pattern may be a special pattern printed on the web for the sole purpose of alignment detection such as a dot or a line located outside any other printed areas which may be on the web; and such special patterns may if desired be located to coincide with parts of the web which are subsequently to be removed by trimming or otherwise rendered unobjectionable.

Alternatively, the periodically repeating pattern need not be a printed pattern, but may comprise, for example, a series of perforations of periodically repeating characters in the material of the web, or a series of regions on the web treated so as to make them transparent or translucent if the rest of the web is relatively opaque, or opaque if the rest of the web is relatively translucent or transparent. The pattern need only be of such a character that it presents a different light reflectivity or light transmissibility from the body of the web itself.

Figure 3:
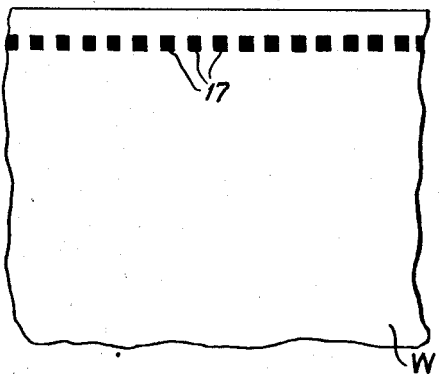

Figures 2 through 7 aid in visualizing what is meant by the terms "periodically repeating pattern" as used in the preceding few paragraphs. Figure 2, for example, shows a fragment of a paper web W as it ordinarily comes from the roll R, and represents either the obverse or the reverse of the web. It is seen that the web W has no printed matter or other type of "periodically repeating pattern" thereon. Fig. 3 shows the obverse of the web W after it has been provided with a simple form of printed periodically repeating pattern, comprising a row of spots 17. The spots may be printed on the web W by a special small mechanism provided especially for this purpose, or they may be printed on the web W by the first press P1 through which the web passes, or they may be provided pre-printed on the web W as it comes in the form of roll R. The spots 17 may be located on the web in a region that is to become the binding margin of a book page, for example, or on an edge of the web that is later to be trimmed off, or the spots 17 may be printed in a disappearing ink that remains visible only long enough for alignment detection purposes.

For maximum convenience, the row of spots 17 is not printed on the web prior to its passage through the first press P1, the web then being laterally controlled before it enters the press P1 by alignment detectors inspecting the edge of the web. In other words, referring to Fig. 1, lateral alignment detectors A1 and A2 are of the edge-inspecting type, but since the press P1 provides a periodically repeating pattern on the web W in the form of a row of spots 17, for example, lateral alignment detectors A3 and A4 may be and preferably are types that inspect the periodically repeating pattern. If the aforesaid special printing mechanism is used to put the pattern on the web W, however, instead of the press P1, or if the web in the roll R is pre-printed with the pattern, then one or both of the lateral alignment detectors A1 and A2 may be of the pattern-inspecting type, depending (in the former instance) upon the location of the said special printing mechanism.

Figure 4:
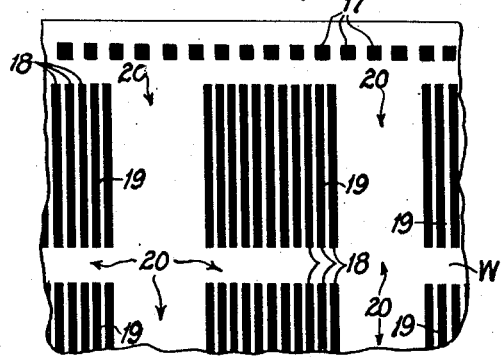

Fig. 4 shows the obverse side of the web W after it has passed through the first press P1. The press P1 has imprinted upon the web W a number of lines 18 of characters such as letters and numbers. For simplification, the lines are shown in Fig. 4, and in subsequent figures, as solid black lines. The lines 18 are arranged into groups or regions 19, which are separated by unprinted spaces 20. Each of the groups 19, considered as a group, represents a pattern on the web W, and by the very nature of the press cylinders 9 and 10, and the manner in which they imprint the regions 19 on the web W, said regions 19 recur at periodic intervals (at least as often as once for each complete rotation of the cylinders 9 and 10) on the web W. Hence the regions 19 are classed as "periodically repeating patterns" as above defined.

Figure 5:
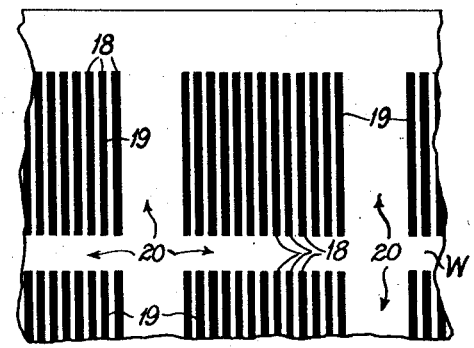

The reverse side of the web W is not ordinarily printed in the first press P1. Printing on the reverse side of the web W is ordinarily done in the second press P2, after which it has the appearance, for example, as shown in Fig. 5. Like the obverse shown in Fig. 4, the web W has been imprinted with a number of lines 18 arranged in periodically repeating groups 19 separated by unprinted region 20. Thus, in the example shown, both obverse and reverse sides of the web W are provided with periodically repeating patterns.

Figure 6:
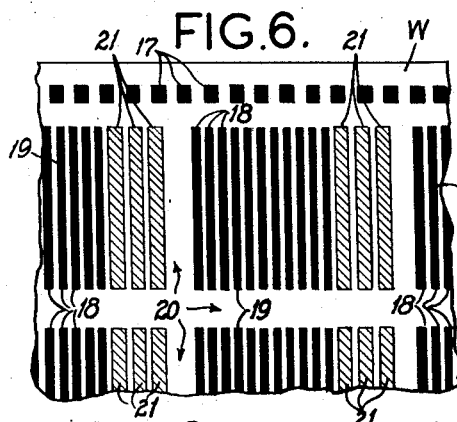

If two colors are wanted in the finished printing, and but one side of the web W is to be printed, then the second press P2 may be used to print the second color, with suitable interchange of the printing and backing cylinders. For example, the obverse side of the web W as it proceeds from the second press P2, set up as a color press, is indicated, for example, in Fig. 6. Here it will be seen that in addition to the matter appearing in Fig. 4, portions of the unprinted spaces 20 have been filled with additional printed matter 21, which may, for example, be in a color other than that of the printed region 18. In Fig. 6, the periodically repeating pattern may now be considered to consist of the combination of a group of lines 18 and their associated regions 21, or of the groups of lines 18 or the groups of lines 21 taken separately, providing the detection system is of differential color sensitivity, if lines 18 and 21 differ in color.

If two or more colors are wanted in the finished printing, and both sides of the web W are to be printed (even if one side has but one color), then additional presses over the two presses P1 and P2 shown in Fig. 1 are ordinarily needed, and alignment controls are preferably provided for each of these additional presses. Alignment controls, for example, are of particular utility in securing accurate registry of overlapping color impressions in multi-color (such as three- or four-color) picture printing, where multiple presses are involved.

Figure 7:
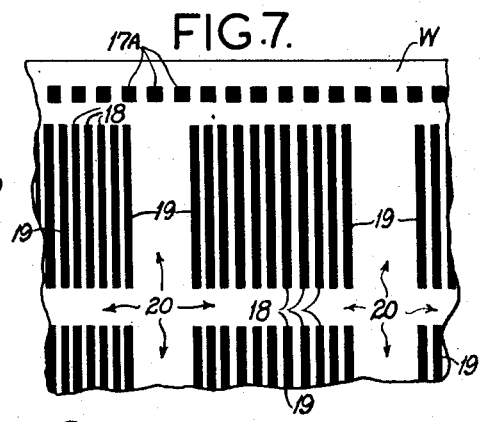

Ordinarily, the special periodically repeating pattern provided for alignment detection purposes, such as the spots 17, need appear only on one side of the web W. However, in some instances it is advantageous to have this pattern on both sides of the web. In this case such a pattern on the reverse side of the web may be provided (1) in the web W initially, as it comes in the form of roll R, (2) by the same special printing mechanism hereinbefore referred to, or a duplicate of it, or (3) by the press P2 as the reverse of the web W receives its first printing impression. Fig. 7 shows such a special pattern in the form of a row of spots 17A, similar to the row of spots 17 in Figures 3, 4, and 6. It is important, when a special pattern such as the spots 17A is provided on the reverse of the web W, that it align accurately with the special pattern (such as the spots 17) on the obverse of the web W, so that one lateral alignment detector inspecting the obverse of the web will not buck against another lateral alignment detector inspecting the reverse of the web.

For lateral web alignment the detection is applied in such a way as to determine whether or not a web edge or a pattern edge or both edges have wandered from their true or desired course, due to non-uniform web tensions for example, and the correction is applied in such a way as to remove effectively the cause of the wandering of the edge of the web or of the sequence of patterns with respect to the edge of the web or both. It is not necessary to detect and correct web alignment and pattern alignment simultaneously nor with the same apparatus, nor is it necessary to detect and correct either alignment once each successive cycle. Detection and correction may occur several times at predetermined relative intervals during each cycle of any predetermined or random fraction of the total number of cycles which fraction may be unity, or they may occur only once during each of said cycles if desired. It is clear that the required relative frequency of detection and correction will depend in any case on the magnitude of the tendency to wander, on the degree to which the correction is to be applied and on other things.

The preferred system for lateral alignment detection in connection with the present invention, using the principles of pattern inspection, is illustrated in Figures 8 through 15. A system of the type indicated in Figures 8 through 15 may be used, for example in locations A3 and A4 in the diagrammatic illustration, Fig. 1, and in locations A1 and A2 (or one of them) if the pattern is on web W prior to its passage through the first press P1, as hereinbefore described.

Figure 8:
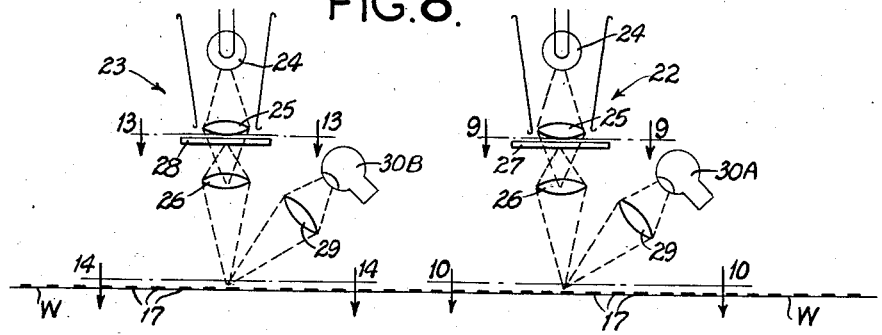
Fig. 8 is a diagram of an optical arrangement for a preferred lateral alignment control.

The preferred lateral alignment system illustrated in Figures 8 through 15 makes use of the row of spots 17 on the web W, as shown in Figures 3, 4, 6 and 7. For this preferred system, the spots 17 are each of square shape and the same size, and are spaced apart, on a common center line running parallel to the edge of the web W, distances equal to their own widths. The spots 17 are preferably printed on with ink or pigment (such as black) which reflects discernibly less light than the surrounding, unprinted regions of the web W. In Fig. 8, which is an edgewise view of the web W, the spots 17 are given a considerable elevation, so that their function with respect to the remainder of the apparatus may be understood; in practice, it will be understood, the spots 17 are only of the thickness of printing ink.

As appears from Fig. 8, there is mounted above the web W a pair of optical systems indicated generally by numerals 22 and 23. The optical system 22 is the lateral web alignment detector proper, while the optical system 23 is for the purpose of generating an alternating current used with the lateral alignment correcting means, as will be explained hereinafter. The two optical systems 22 and 23 are identical, except for the apertures in certain masks. Each system comprises a light source 24, which may suitably be an incandescent filament bulb in which the filament is concentrated into a small area. In each system 22 and 23, a lens 25 focuses an image of the filament of light source 24 into a second lens 26. Positioned just in front of each lens 25 is a mask, indicated by numeral 27 in system 22 and by numeral 28 in system 23. The front lenses 26 focus images of certain apertures in the masks 27 and 28 on the web W. In each system 22 and 23, the respective light sources 24, and lenses 25 and 26, are arranged on an optical axis which is preferably, although not necessarily, perpendicular to the plane of the web W, and the masks 27 and 28 are perpendicular to these optical axes (or parallel to the web W, in any event).

Arranged on optical axes which intersect the points of intersection of the axes of the systems just described and the web W, for each system 22 and 23, are photoelectric detection systems comprising collecting lenses 29 and suitable photoelectric cells 30A and 30B. The lenses 29 project rays emanating from the images on the web, of the apertures in masks 27 and 28, on the receptive cathodes of the photoelectric cells 30A and 30B, respectively.

Figure 9:
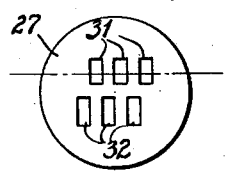
Fig. 9 is a cross section taken substantially along line 9—9 of Fig. 8, showing a mask.
Figure 10:
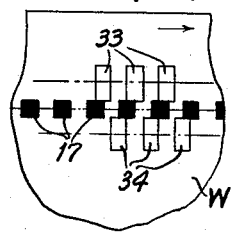
Fig. 10 is a cross section taken substantially along line 10—10 of Fig. 8, and illustrates the image of the mask of Fig. 9, as projected onto a web, the said web being properly aligned.

The mask 27 for the optical system 22 is shown in plan view in Fig. 9. The mask 27 has two parallel rows of uniformly spaced rectangular openings or apertures. The apertures in one row are indicated by index characters 31, while the apertures in the other row are indicated by index characters 32. It will be understood, however, that the apertures 31 and 32 are individually all preferably of the same size. The openings 31 and 32, in their respective rows, are displaced from each other in the direction of the row center-lines by an amount equal to the short dimension of a single aperture, and the two rows are displaced in the direction at right angles to said center-line direction by an amount which causes the projected images of the apertures 31 and 32 on the web W, in the optical system 22 of Fig. 8, to be separated by a distance preferably just equal to the width of the spots 17 on the web W. This arrangement is indicated in Fig. 10, in which rectangles 33 are the images of apertures 31, as projected by the lens 26, and rectangles 34 are the images of the apertures 32. The widths of the individual apertures 31 and 32 are such that the widths of their projected images 33 and 34, along their respective row center lines, are preferably just equal to the widths of the individual spots 17. It will be noted that the two rows 31 and 32 are arranged in a staggered relation, each aperture (except the end apertures) being disposed along its respective center line in such manner that its sides are effectively continuations of the opposite sides of two adjacent apertures in the opposite row. In the embodiment shown, three apertures 31 form one row while three apertures 32 form the other row, but the number three is not critical and may be increased or decreased depending, for example, upon the sensitivity of the photoelectric detecting system employed. The lengths of the individual apertures 31 and 32, in a direction at right angles to the center lines of the rows, are all equal, and are determined by the amount of lateral displacement it is expected to encounter in the moving web. In the embodiment as shown, the apertures 31 and 32 are approximately twice as long as they are wide and this arrangement will provide full correction for a web which does not deviate laterally through a distance more than a maximum of six or so times the width of the row of spots 17.

Figure 13:
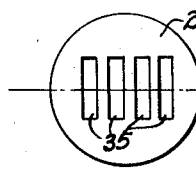
Fig. 13 is a cross section taken substantially along line 13—13 of Fig. 8, showing another mask.

The mask 28 for the optical system 23 of Fig. 8 is shown in plan view in Fig. 13. It contains a single row of parallel rectangular apertures 35 centrally positioned along a common center line. The width of each of the apertures 35, along the common center line, may be equal to the width of the apertures 31 and 32 of mask 27, along their respective center lines; in any case, the width of each aperture 35, along the common center line, is such that the width of its image 36 on the web W (Fig. 14) is equal to the width of each of the spots 17. The apertures 35 are preferably all of the same length, and the length is such that the projected images 36 of said apertures 35 are of the order of twice the length of an image 33 or 34 plus the width, cross-wise of the center line, of the spots 17.

Figure 14:
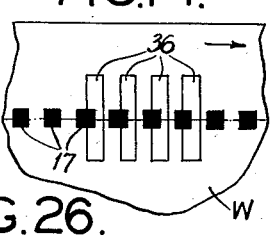
Fig. 14 is a cross section taken substantially along line 14—14 of Fig. 8, showing the image of the mask of Fig. 13 as projected on a web.

The masks 27 and 28 are mounted in their respective optical systems 22 and 23 in such manner that center lines of their projected aperture images on the web W are parallel to the center line of the row of spots 17 on the web W. Further, the optical systems 22 and 23 are so positioned that, when the web W is in lateral alignment, the center line of the row of spots 17 lies mid-way between the center lines of the rows of images 33 and 34, for the optical system 22, and coincides with the center line of the images 36, for the optical system 23. These arrangements are indicated in Figures 10 and 14, respectively. Furthermore, the optical axes of the two systems 22 and 23 are displaced from each other, in a direction along the direction of motion of the web W, in such a manner that when one of the spots 17 exactly coincides with one of the images 36 (i. e., the leading and trailing edges of said spot 17 are coextensive with the forward and rear edges of the image 36), then at exactly the same time, the leading and trailing edges of another one of the spots 17 are in exact register with the forward and rearward edges, respectively, of either one of the images 33 or one of the images 34. For present purposes, it makes no difference whether the images 33 or the images 34 are chosen for this last condition. By such an arrangement, spots 17 cross the images 36 in the same phase relationship that said spots 17 cross the selected row of images 33 or 34, and in an out-of-phase relationship with the other row of images 34 or 33. In Figures 10 and 14, the in-phase relationship is maintained between images 36 and images 33, while images 36 and images 34 are in out-of-phase relationship. The purpose of this arrangement will be described hereinafter.

Figure 15:
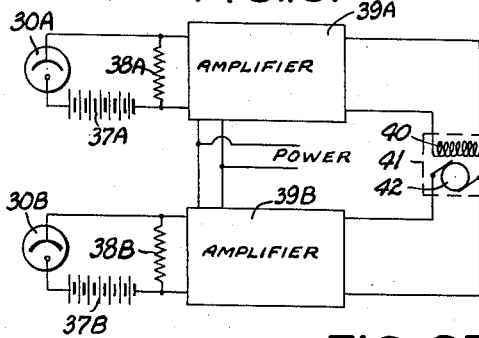
Fig. 15 is an electrical circuit diagram for the lateral alignment control of Fig. 8.

The electrical circuit in which the photoelectric cells 30A and 30B of the optical systems 22 and 23, respectively, are connected, is indicated in Fig. 15. Cell 30A is connected in series with a battery 37A across a resistance 38A, the terminals of which lead to a suitable alternating current amplifier 39A. The design and characteristics of the amplifier 39A are within the abilities of one skilled in the art of photoelectric cell amplifiers, and are not set forth in great detail herein for that reason. By way of example, however, a suitable amplifier circuit is shown, together with its exemplary constants, in Fig. 16. The Fig. 16 circuit is that of a resistance-coupled amplifier having a two stage voltage amplifier using the so-called "type 57" tubes, and a two stage power amplifier using the so-called "type 46" tubes, the last stage of the power amplifier being a push-pull circuit. With the constants shown in Fig. 16, it has proved to be satisfactory to use, as the photoelectric cell 30A, a "visitron type AV" cell, with the resistance 38A having a value of 100,000 ohms and the battery 37A having a potential of 22 volts.

Figure 16:
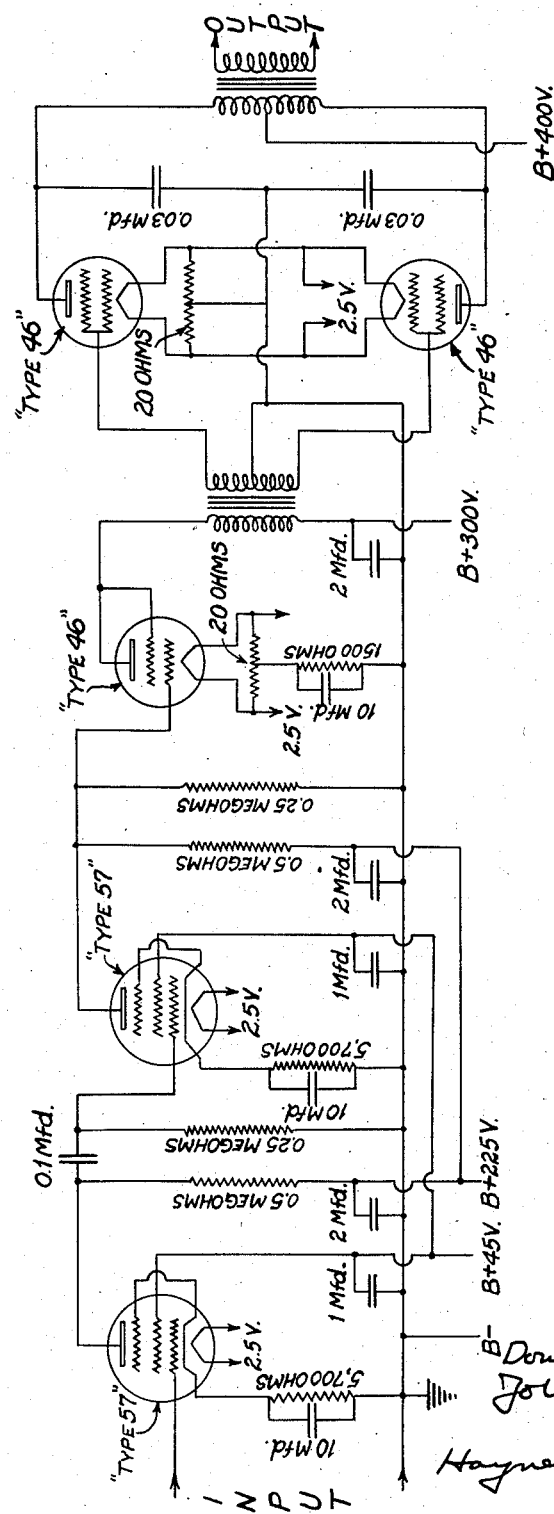
Fig. 16 is an exemplary electrical amplifier circuit.

The photoelectric cell 30B of optical system 23 is similarly connected, in series with a battery 37B, across a resistance 38B, the terminals of which are in turn connected to a suitable amplifier 39B, which may also be of the type shown in Fig. 16, for example.

The output leads of an amplifier 39A are connected to the field 40 of a motor 41, which may be, for example, of common "universal" design for operation on either direct or alternating current. The output leads of amplifier 39B are connected to the armature 42 of the motor 41. Motor 41 is the motor M1, M2, M3, or M4 of Fig. 1, depending upon which lateral alignment system is being considered. As indicated in Fig. 1, motors M1, M2, M3, and M4 are associated with the respective compensating rolls which correct lateral misalignment; the nature of this connection, and of the operation of the compensating roll, will be more fully developed hereinafter.

The operation of the lateral alignment detector as thus described is as follows:

Referring first to the operation of the optical system 22, or lateral alignment detector proper: So long as the web W is in proper lateral alignment, the row of spots 17 continuously passes between the two rows of images 33 and 34 heretofore described. The individual spots 17 do not cross any of the images 33 and 34, and hence do not vary the light reflected therefrom to the photoelectric cell 30A. The light reflected from the images 33 and 34 to the photoelectric cell 30A, it is to be noted, depends in quantity upon the reflection characteristics of the web W. In general the web W reflects more or less diffusely. The spots 17 are printed in an ink, or other substance, which reflects less light than does the web W itself. Or, in the alternative, the spots 17 may be printed with an ink or other substance that reflects more light than does the web W itself. The primary intention is that there shall be a differential reflectivity between the spots 17 and the surrounding area of web W. In all cases in which the differences in said reflection characteristics are unusually small, steps must be taken to increase the differential or else the overall sensitivity of the apparatus as may be required. Furthermore, in general, cases will arise in which the detection can be made more positive through the introduction of selectively absorbing light filters so that the web is effectively illuminated by light of certain spectral characteristics such as red light, for example. The use of selectively absorbing light filters may be particularly advantageous in web alignment detection when the web W is printed with one or more colored substances.

Figure 11:
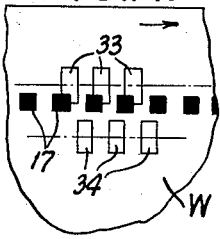
Fig. 11 is a view similar to Fig. 10, but illustrating the same elements when the web is laterally misaligned in one direction.

If the web W becomes misaligned, or wanders, to the left, then the condition pictured in Fig. 11 will be observed. The row of spots 17 now, instead of passing between the rows of images 33 and 34 without affecting either one of them, now passes in such a manner that successive spots intersect or pass across the images 33. Because of the differential reflectivity of the spots 17, with respect to the web W, this passage of the spots 17 across the images 33 will result in the variation or modulation of the amount of light reaching the photoelectric cell 30A, and, because of the intermittent character of both the spots 17 and the images 33, this modulation will be of a periodically varying character setting up an alternating current in the photoelectric cell 30A. The frequency of the alternating current is dependent upon the speed of travel of the web W, one complete alternation being produced each time a spot 17, and its succeeding blank space, traverses one of the images 33. The several images 33, it will be seen, act in parallel in this respect, and thus so serve to increase the amount of modulated light falling on the photoelectric cell 30A without in any way affecting the frequency of the modulation.

The periodic variation in the amount of light reaching the photoelectric cell 30A, which is connected in series with the battery 37A and the resistor 38A, causes a periodic variation in the amount of current flowing through the resistor 38A. Since the input terminals of the alternating current amplifier 39A are connected to opposite ends of the resistor 38A the alternating current component in the voltage drop across the resistor 38A produced by the variation in the current flowing through the resistor 38A causes the amplifier 39A to deliver alternating-current power, of suitable magnitude, to the field 40 of the motor 41. The fundamental frequency of the alternating current power so produced is the same as the fundamental frequency of the periodic variation in the amount of light reaching the photoelectric cell 30A.

The fact that the photoelectric cell 30A may be receiving unmodulated light (such as is reflected from the momentarily unaffected images 34, for example) at the same time that it is receiving modulated light from the images 33, is of no consequence, since the response of said photoelectric cell 30A is then a direct current response and this introduces no alternating current component in the voltage drop across the resistor 38A.

Motors such as the one indicated at 41 in Fig. 15 are ordinarily designed to be operated on sinusoidal alternating current, but unless suitable steps are taken current from the amplifier 39A will not be sinusoidal. If the amplifier 39A amplifies without distortion of the wave form, the output current may be expected to have the wave form of the alternating current component of the voltage drop across the resistor 38A, and said voltage drop can be made to have substantially the wave form of the light modulation produced by the motion of the spots 17 across images 33 as hereinbefore described. The shape of the spots 17 and of the images 33 (and 34) can be calculated in such manner that the wave form of the modulation can be controlled, as in the reproduction of sound in talking motion pictures, but this is usually impracticable for several reasons, and hence, therefore if the motor 41 does not function satisfactorily on nonsinusoidal current, all undesirable harmonics should be removed by means of a filter network having a high transmission for alternating current of the fundamental frequency, such as a band-pass filter, for example. It is recognized that alternating current amplifiers may have filter networks possessing the aforementioned characteristics, and, therefore, it is assumed that the amplifier 39A is so designed.

Figure 12:
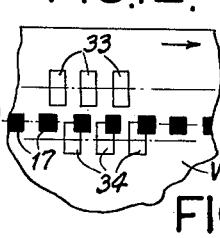
Fig. 12 is a view similar to Fig. 10, but illustrating the elements when the web is laterally misaligned in the other direction.

If the web W wanders or deviates or becomes misaligned laterally to the right, the condition pictured in Fig. 12 will be observed, instead of the condition pictured in Fig. 11. The only difference between Fig. 11 and Fig. 12 is that in Fig. 12 the modulation of light reaching the photoelectric cell 30A is produced by the passage of spots 17 across the images 34, rather than the images 33. Electrically, the effect is the same as that described which relates to Fig. 11. However, since the images 34 are spaced at a different relative location than the images 33, the peaks of alternating current produced across the resistance 38A will occur at different times. This time relationship will be developed more fully hereinafter.

The operation of the optical system 23, hereinbefore designated as an alternating current generator, will now be described. In general, it is similar to the operation of the optical system 22, with the exception that light modulation is now produced by passage of the spots 17 across the images 36 (see Fig. 14) regardless of the deviation or wandering of the web W, within limits determined by the lengths of the images 36. This passage of the spots 17 across the images 36 means that modulated light, of the same wave form as that produced in the optical system 22, will be delivered at all times to the photoelectric cell 30B, and this will in turn cause the imposition of a relatively constant form of alternating current component in the voltage drop across the resistor 38B. This alternating current component in the voltage drop across the resistor 38B is amplified by the amplifier 39B, which is in many respects similar to the amplifier 39A, and the amplifier 39B thus delivers alternating current power to the armature 42 of motor 41. As in the case of amplifier 39A, amplifier 39B may desirably have a filter network for affecting the wave form of the output alternating current, to make it suitable for running the motor 41.

Because the same spots 17 actuate the photoelectric cells 30B and 30A, and because the widths of the images 33, 34 and 36 are all the same, the fundamental frequencies of the alternating current power produced by the amplifiers 39A and 39B will be the same. Because of the longitudinal spacing requirements for the optical systems 22 and 23, as hereinbefore mentioned, the outputs of amplifiers 39A and 39B will be in phase if it is modulation of the light from the images 33 that is affecting the photoelectric cell 30A (or, in other words, if the web is misaligned to the left). Or, on the other hand, if the modulation of light reaching the photoelectric cell 30A is produced by passage of spots across the images 34 (in the case of lateral deviation of the web to the right), the alternating current power delivered by the amplifier 39A to the motor 41 will be 180° out of phase with respect to the power delivered by the amplifier 39B. The motor 41 is of such characteristics that when its field and armature are respectively excited by the in-phase currents, it rotates in one direction, while when its field and armature are respectively excited by the out-of-phase currents, it rotates in the other direction.

In the foregoing discussion it is assumed for simplicity that the phase displacements between input signals and respective output currents in the amplifiers 39A and 39B are identical. The principle is unaffected by this assumption. In any case the distance between the optical systems 22 and 23 is adjusted to establish the desired phase relationship between the output currents of the amplifiers 39A and 39B so that the operation of the equipment is substantially as recited.

It is now seen that, with the system described, lateral deviation of the web W in one direction results in the rotation of motor 41 in one direction, while lateral deviation of the web W in the other direction causes the motor 41 to run in the other direction. If the web W is running true, as shown in Fig. 10, then since the photoelectric cell 30A receives no modulated light, the amplifier 39A delivers no alternating current power to the motor field 40, and hence the armature of the motor 41 does not move at all.

As has heretofore been intimated, and as will be described more fully hereinafter, the motor 41 controls a compensating roll mechanism in such manner that when it rotates in one direction or the other, it tends to correct the misalignment of the web, laterally, in the proper direction.

It will be seen that the amount (not frequency) of modulation of the light reaching the photoelectric cell 30A depends upon the relative areas of the individual spots 17 that pass through the images 33 or 34, and that this relative area in turn depends upon the extent of lateral displacement. For example, if the lateral displacement is but slight, then, as indicated in Figures 11 and 12, only part of the area of each spot 17 passes across the respective images 33 or 34. If the lateral deviation is great, then the entire area of each spot 17 will cross either image 33 or 34. The amount of photoelectric current modulation as thus produced, affects the amplifier 39A in such manner that a related amount of alternating current power is delivered to the field 40 of the motor 41. In other words, the greater the lateral deviation, the stronger the alternating current signal delivered to the amplifier 39A, and the greater the alternating current power delivered to the motor 41. Since the speed of rotation of the motor 41 depends upon the amount of power delivered to it, greater lateral deviation of the web W will cause faster rotation of the motor 41, and consequently more rapid correction of the lateral deviation. This factor is important in the operation of the press as a whole, because it means that greater lateral deviations, which are more wasteful of web material, will be reduced more rapidly than small deviations, which are not so serious from the standpoint of waste.

The characteristics of the amplifiers 39A and 39B are made such that at all operating speeds of the press, sufficient power is delivered to the field 40 and armature 42 of motor 41 to insure the performance described. It should be noted that in general the armature 42 of the motor 41 requires several times as much power as the field 40, and therefore the amplifier 39B must be designed with this purpose in mind.

While the lateral alignment detection system thus described is preferred for use with presses of the type herein principally concerned, it may be widely modified and take several highly varying forms, of which several will be described in greater detail hereinafter.

The preferred form of compensating roll for making corrections of the misalignments detected by the lateral alignment detectors hereinbefore described, will next be explained. Rolls such as the one now to be described are indicated by the various reference characters C1, C2, C3, etc., in the general layout of the press comprising Fig. 1.

In the preferred compensating roll, corrections are made on the moving web, both for its lateral and its longitudinal deviations, by means of a single idler roller, which frictionally engages the moving web of paper. The compensating roll includes means for properly positioning said single idler roller in order to get the desired corrective effect.

The preferred form of compensating roll is shown in Figures 17 through 24, inclusive, to which attention is now directed. Referring to these figures, and more particularly to Fig. 17, numeral 188 indicates the single idler roller just mentioned. The roller 188 is mounted on a shaft 189, the ends of which are received in suitable frictionless bearings 190 and 191 mounted in arms 192 and 193, respectively. The arm 192 is simplest in construction, and will first be described. It comprises a simple radial arm extending from a hub 194 which is secured by set screws 195 to a shaft 196 which extends the width of the press. The roller 188, it will be understood, is preferably slightly longer than the width of the web. One end of the shaft 196 is rotatably received in a bearing 197, while the other end is likewise rotatably received in a bearing 198. Shaft 196 has a portion 199 of reduced diameter at the end which enters the bearing 198.

Both extreme ends of the shaft 196 are preferably provided with collars 200 through which extend taper pins 201 for holding the shaft 196 against sidewise motion in the bearings 197 and 198.

The other end of the roller comprises a collar 202, which is secured to the shaft 196 by set screws 203. From the collar 202 extends a bracket or arm 204, in which is received a stud 205 provided with a bearing surface 206. A screw 207 secures the stud 205 against rotation in the arm 204. The axis of the stud 205 is parallel to the axis of the shaft 196. Rotatably mounted on the bearing portions 206 of stud 205 is a collar 208, from which extends a radial arm 209. The roller bearing 191 is mounted at the far end of arm 209.

Referring now to Fig. 18, it will be seen that the bracket or arm 204 has at its extreme end a pair of parallel projections 210. On the outer faces of the two projections 210 are mounted roller or like frictionless bearing elements 211, and these bearings 211 serve to mount therebetween a lead screw 212, which extends through the projections 210 and across the space therebetween. At its lower end, the lead screw 212 is connected by a suitable coupling 213 to a flexible shaft 214. Threaded on the lead screw 212 is a nut 215 which has a cylindrical portion 216 extending rearwardly, its axis being parallel to the axis of the stud 205. Portion 216 receives a roller 217, and the roller 217 is held in position on the portion 216 by a washer 218 and a screw 219, as indicated in Fig. 23. The roller 217 slides up and down in a slot 220 provided therefor in arm 209.

It will now be seen that if the lead screw 212 is rotated, the nut 215 will move up and down said lead screw, relative to the bracket or arm 204, and that motion of the nut 215 in the manner described will in turn cause rotation of the arm 209 pivotting on stud 205. By way of illustration, Figures 18 and 20 show the relative position of the arms 204 and 209 when the nut 215 is at the bottom of the lead screw 212; Fig. 19 shows the relative position of the arms 204 and 209 when the nut 215 is at the top of the lead screw 212. The relative motion of the roller 188 thus brought about by turning the lead screw 212 in a tilting motion, and results in an adjustment of the angle made by the axis of roll 188 with the axis of shaft 196. When the nut 215 is in its central position on lead screw 212, the arms 204 and 209 are so positioned, relative to each other, that the axis of the roller 188 is parallel to the axis of shaft 196.

The bearings 190 and 191 for the ends of shaft 189 of roller 188 are purposely made in such a manner as to permit the tilting of the roller 188 in the manner described, such as self-aligning ball bearings.

Returning again to Fig. 17, it will be seen that the collar 202 and brackets 204, are provided with a forwardly extending flange or collar 221. Additional set screws 222 are desirably provided in the collar 221, for securing the assembly firmly to the shaft 196. The face of collar 221 receives one end of a tension or coil spring 223 that is wrapped around the shaft 196. The other end of the coil spring 223 is firmly mounted in the face of a collar 224 which rotates upon the portion of reduced diameter 199 of the shaft 196. The collar 224 is secured against longitudinal movement relative to the shaft 196 by positioning it between the bearing 198 and the shoulder resulting from the portion of reduced diameter 199. Extending downwardly from the collar 224 is a sector-shaped gear 225, the lower periphery of which is threaded, as indicated at numeral 226 in Fig. 24, to engage the threads of a worm wheel 227. The worm wheel 227 is in turn mounted on a shaft 228.

Numeral 229 indicates an arcuate slot that is provided in the collar 224, and numeral 230 indicates a radial pin that is mounted in the shaft 196 in position to engage the ends of slot 229. Normally, the pin 230 is positioned to abut end of slot 229.

The operation of the compensating roll as thus described in the finished press is as follows:

As has heretofore been intimated, the roller 188 frictionally engages and idles with the moving web. The bearings 197 and 198 are so positioned that the shaft 196 is supported with the roller 188 in the desired engagement with the web. It will be assumed, for the moment, that the nut 215 is located midway on the screw 212. A flexible shaft 214 connected with the lead screw 212 is coupled with the shaft of motor 41 (Fig. 15) of the lateral alignment detection system (this motor is variously designated as M2, M3, and M4 in Fig. 1).

If the lateral alignment detector now detects a lateral misalignment, this will result in the rotation of the shaft of motor 41 in a direction depending upon the direction of lateral misalignment. Rotation of the shaft of motor 41 in turn rotates the lead screw 212 by the connection described, and rotation of the lead screw 212 moves the nut 215 up and down thereon, causing relative rotation of arm 209 on bracket 204. The net result of this movement is to tip or tilt the axis of rotation of the roller 188. By tilting the roller 188, the direction in which the web is proceeding is altered, and by altering this direction, the lateral misalignment is corrected. If the direction of lateral misalignment is against the travel of the web, the extra pressure on the web resulting from the correcting tilting of the roller 188 is temporarily transferred to spring 223, by the reaction through pin 230 in its normal position of rest against the end of arcuate slot 229. In a brief time, however, spring 223 returns to its present position, thus applying the full lateral correction required in a resilient manner. The correction of a lateral misalignment with the direction of travel of the web relieves normal web tension, and hence no resilient application of the correction is needed.

Figure 26:
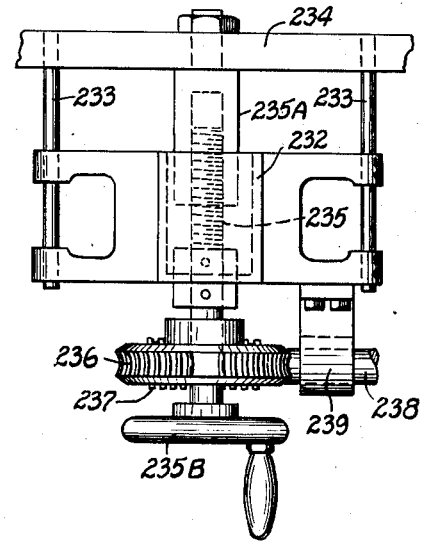
Fig. 26 is a plan view of a fragment of the device of Fig. 25, being taken on line 26—26 of Fig. 25.
Figure 25:
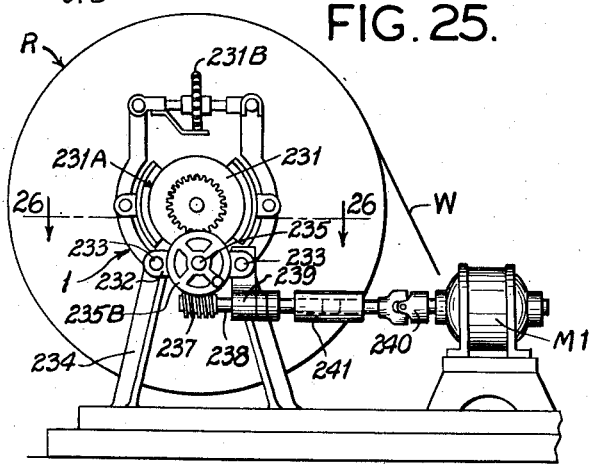
Fig. 25 is a front elevation of a paper roll shifting device.

Still referring to Fig. 1, it will be seen that the first lateral alignment detector AI operates through a motor MI which affects directly the roll-shifting device 15 on the paper roll cradle 1. In this respect, the system operated by lateral alignment detector AI is different from the systems operated by the other lateral alignment detectors. This implies no difference in the construction of the lateral alignment detector AI itself, but merely the device upon which it operates and through which it introduces its correction. The roll-shifting device operated by lateral alignment detector AI is indicated more particularly in Figures 25 and 26.

The roll-shifting device 15 is generally of a type frequently provided for paper rolls, and comprises a bearing portion 231 for receiving the shaft of a paper roll, which bearing portion 231 is mounted on a block 232. The block 232 is in turn supported on pins 233 which slide horizontally in the frame 234 of the cradle. A lead screw 235 is mounted on the block 232, and cooperates with a cylindrical nut 235A secured to the frame 234. A hand wheel 235B and a worm wheel 236 are mounted on the end of the lead screw 235. It will be seen that when either the hand wheel 235B or the worm wheel 236 is turned, the block 232 moves laterally relative to frame 234, and hence changes the lateral alignment of the web W coming from the paper roll. The bearing portion 231 includes a drum and cooperating brake shoes indicated generally by numeral 231A, as is customary in devices of this character. The brake shoes are adjusted by a hand wheel 231B to regulate the tension in the web W leaving the roll.

The worm wheel 236 is engaged by a worm 237 on a shaft 238 supported in a suitable bearing 239 mounted on the block 232. The shaft 238 is driven by the motor MI through a universal joint 240 and a telescoping joint 241.

Depending upon the direction of rotation of motor MI (which is in turn determined by the direction of misalignment detected by the lateral alignment detector AI), the worm 237 will drive the worm wheel 236 in such manner as to rotate the lead screw 235 and shift the block 232 laterally, in exactly the same manner as if said correction had been applied through manipulation of the hand wheel 235B in the manner heretofore practiced in connection with this type of apparatus.

Fig. 27 indicates an alternative lateral alignment detector circuit which is in some respects a simplification of the circuit shown in Fig. 15. It will be recalled, by reference to Fig. 8, that the optical system 23 and photoelectric cell 30B, together with its connected amplifier 39B, all were described as an alternating current generating system. In Fig. 27, this photoelectric alternating current generating system is eliminated, and replaced by a simple, ordinary form of alternating current generator indicated by numeral 242. This alternating current generator 242 is mechanically driven from some rotating part of the press, such as one of the press cylinders, so that the generator 242 produces current at a fundamental frequency corresponding to the fundamental frequency of the current produced by the photoelectric system 22 (Fig. 8) and applied to the field 40 of the motor 41. The generator 242 is connected direct to the armature 42 of the motor 41. The circuit feeding the field 40 is the same as in Fig. 15.

The operation of this alternative embodiment of Fig. 27 is substantially identical to the operation of the preferred lateral alignment detector, except that the armature current is supplied with mechanically generated alternating current, from the generator 242, instead of photoelectrically generated alternating current, from the optical system 23, photoelectric cell 30B, etc. This embodiment may accordingly be designated as one in which the armature current is mechanically generated, instead of photoelectrically generated. This embodiment should be used only when a careful control of the longitudinal alignment of the web is maintained, since longitudinal misalignment, if great enough, might result in an unwanted phase displacement, between the field and armature voltages of the motor 41.

Alternating currents can be generated, with certain favorable setups of type, by using the printed matter itself in an optical-photoelectric system such as that shown in Figures 28 through 31, inclusive. Use is now made of the alternating light and dark areas constituting the lines of printed matter themselves upon the web W. These lines of printed matter are indicated with their usual numeral 18 in Figures 28 and 29. Referring now more particularly to Fig. 28, numerals 243A and 243B indicate a pair of incandescent filament lamps, the filament of each of which preferably comprises a long coil, indicated in Figure 31 by numeral 244, supported on supports 245 at its ends. Lenses 246A and 246B project images of the filaments 244 of lamps 243A and 243B on the surface of the moving web W, as indicated in Fig. 28, in such manner that the projected images 247A and 247B lie parallel to the lines 18 of printed matter. The optical axes of the two systems are so arranged with respect to the printed matter on the web W that one of the images 247A and 247B is at all times within a printed region; in other words, the distance $d$ (Fig. 28) is such that at no time is it possible for both image 247A and image 247B to lie in an unprinted area. A photoelectric cell 248A looks at the image 247A through a collecting lens 249A, while a similar photoelectric cell 248B looks at the image 247B through a collecting lens 249B.

Fig. 30 shows the electrical circuit in which the photoelectric cells 248A and 248B are connected. Referring to Fig. 30, it will be seen that the two photoelectric cells 248A and 248B are connected in parallel, and function in the circuit as a single cell. It is merely as if the photoelectric cells 248A and 248B, together connected in parallel, are substituted for the single photoelectric cell 30B in the alternating current generator side of the circuit of Fig. 15. The usual battery 37B and resistance 38B and amplifier 39B are provided, and the output of the amplifier 39B can be used in any desired manner, for example, in connection with an alignment detection and correction system.

If necessary, more than two complete optical systems as indicated in Fig. 28 may be provided, in order that at least one filament image is at all times focused on a region including printed lines 18. In this detection system, in which synchronism is an important feature, it is important that the printed lines 18 be equi-distantly spaced and that unprinted areas have lengths, measured along the length of the web W, such that were they filled with lines 18, all lines on the web W would be equi-distantly spaced. The distance d (Fig. 28) between light spots is therefore a whole multiple of the spacing of the lines 18.

The operation of this alternating current generator is as follows: When the web moves longitudinally, the passage of lines 18 through or across the images 247A and 247B produces a flicker or modulation in the reflected light reaching the photoelectric cell 248A or the cell 248B, or both, and therefore the current flowing through the resistor 38B contains an alternating current component and the voltage drop across the resistor 38B contains an alternating current component. From this point on, the operation of this alternating current generator is precisely the same as that of the preferred embodiment, as indicated above. The fact that one photoelectric cell 248A or 248B may be receiving unmodulated light during a part of the time is of no consequence since the response of said cell is then a direct current response and no alternating current component in the voltage drop across the resistor 38B results. As in the case of the preferred embodiment, it is desirable that the amplifier 39B of Fig. 30 be provided with a filter net-work or other suitable means for regulating the wave form of the output alternating current.

Fig. 32 indicates an alternative construction that may be substituted for the optical system shown in Fig. 28. The only change, in this instance, is that a single photoelectric cell 250 is provided, which cell 250 receives a light from both images 247A and 247B. This is accomplished by suitably positioning the lenses 249A and 249 B. The single photoelectric cell 250 now receives the modulated light from both images, and is preferably connected in a circuit identical to that of Fig. 30 except that only one photoelectric cell is used. In other words, the circuit connections now become identical to those shown in Fig. 15, with the single photoelectric cell 250 replacing the photoelectric cell 30B.

In the embodiments of Figures 28 and 32, it is not necessary that the image on the web W be that of a coil filament 244 as shown. For example, Fig. 33 shows a single optical system (which is used in duplicate in either the Fig. 28 or Fig. 32 embodiment), in which a lamp 251 of the concentrated filament type is provided. A lens 252 focuses an image of the filament of lamp 251 on a lens 253, in such manner as to fill the lens 253 with light. Numeral 254 indicates a mask which is positioned between the lenses 252 and 253, as close to the lens 252 as possible. The lens 253 focuses images of apertures in the mask 254 on the web W.

The mask 254 is indicated in plan view in Fig. 34. It will be seen that it is provided with a plurality of apertures 255, which constitute parallel long narrow rectangles. The size and disposition of the rectangular apertures 255 is such that these apertures, projected by the lens 253, will form images on the web W, which images exactly overlie the printed lines 18 on the web W. In other words, images of the apertures 255 are now substituted for the filament images 247A and 247B of Fig. 29. The aperture images operate in exactly the same manner in generating alternating current as do the images of the coil filaments 247A and 247B. In Fig. 33, a single photoelectric cell 256 is shown; this photoelectric cell will be either the cell 248A, the cell 248B, or the cell 250, depending upon which embodiment is used with the mask type of light projector shown in Fig. 33.

All of the alternative embodiments heretofore described are concerned with alternate methods of generating alternating current power for the armature 42 of the motor 41, the lateral alignment detector proper of the preferred embodiment having been left unchanged. Fig. 33, together with Figures 35 through 39, serves on the other hand to illustrate an alternative form of lateral alignment detector proper. For this alternative embodiment, the mask 254 of the Fig. 33 optical system is replaced by a mask 257 as shown in Fig. 35. The mask 257 is provided with three substantially square apertures 258, and these apertures are of such size and shape that their images on web W are of size and shape identical to any three consecutive selected spots 17 of the row of spots 17 heretofore described. The row of spots 17 is again used for lateral alignment detection, as in the preferred lateral alignment detector. The identity in size, shape, and disposition, of the images of apertures 258 in mask 257 with the spots 17, is shown in Fig. 36, where the said images are indicated by numeral 259.

Fig. 36 shows the preferred normal condition to be obtained when the web W is in proper lateral alignment. It will be seen that in this normal arrangement, the center line of the row of spots 17 is displaced from the center line of the row of images 259 by an amount equal to half the width of the spots (or the images); in other words, as the web W moves, the maximum area overlapped is one-half the total area of the images. The center lines of the images 259 of the spots 17 are, however, parallel.

The photoelectric cell 256 (Fig. 33) is arranged to look at the images 259 through a collecting lens 260. Under normal conditions of proper lateral web alignment, the cell 256 will receive uniform unmodulated light from one-half of each of the images 259, and modulated light from the other half of said images 259, as successive spots 17 pass thereacross. If lateral misalignment should occur, in such manner that the web W is misaligned to the left, however, the condition shown in Fig. 37 will be brought about. In Fig. 37, it will be noted that the center lines of the spots 17 and images 259 are now displaced by such an amount that the spots 17 no longer cross over any part of the images 259 at all, but merely pass tangent thereto. This means that the photoelectric cell 256 will now receive nothing but uniform unmodulated light, since the lack of any intersection of the spots 17 with the images 259 means that no modulation will be brought about. Just prior to the achievement of this maximum condition, however, it will be seen that the relative portion of the area of the images 259 traversed by the spots 17 reaches a minimum value; hence the amount of modulated light reaching the cell 256 will be a minimum.

If lateral misalignment to the right takes place, looking in the direction of travel of the web, the condition observed in Fig. 38 may be observed. Here a maximum condition is pictured, such that the center lines of spots 17 and the center line of the images 259 now exactly coincide. With the condition of Fig. 38, it will be seen that a maximum amount of modulated light will reach the photoelectric cell 256, because now the spots 17 are passing across the entire areas of the images 259, and effectively greatly modulating the light reflected therefrom to the photoelectric cell 256.

Referring to Figures 36, 37, and 38 together, it will be seen that the system is such that if normal lateral alignment is maintained, a modulated current of normal magnitude is produced by the photoelectric cell 256; if lateral misalignment to the left takes place, the amount of modulated current is reduced, while if lateral misalignment to the right takes place, the amount of modulated current is increased.

Fig. 39 shows the circuit by which this varying amount of modulated light reaching the photoelectric cell 256 is translated into an effective control. Referring to Fig. 39, it will be seen that the photoelectric cell 256 is connected in series with a battery 261 and the series combination is connected across the ends of a resistor 262. The resistor 262 is in turn connected to an amplifier 263, such as is used in previous embodiments. The output of the amplifier 263 is fed into a suitable rectifier 264, which is capable of changing the alternating current component of the output current of the amplifier 263 to a direct current. Numeral 265 indicates a resistor that is connected across the output of the rectifier 264. One of the output wires then goes to the sliding contact 266 of a potentiometer 267, across the ends of which is connected a battery 268.

Numerals 269 and 270 indicate the oppositely facing magnets or coils of a relay 271 to be described in greater detail hereinafter. The coils 269 and 270 are connected in series, and the midpoint thereof is connected to one end of the potentiometer 267, as illustrated. The other end of coil 269 is connected to the anode of a half-wave rectifier 272, while the other end of coil 270 is connected to the cathode of a half-wave rectifier 273. The cathode of rectifier 272 and the anode of rectifier 273 are in turn connected together and to the opposite output wire of the rectifier 264.

Numeral 274 indicates the armature of the relay 271, and this armature 274 is normally held in position (as by a spring) mid-way between the coils 269 and 270. The armature 274 carries a pair of central movable contacts 275, which individually cooperate with two pairs 276 and 277 of relatively fixed contacts. The arrangement of the movable contacts 275 and fixed contacts 276 and 277 is that of the customary double-pole, double-throw switch, and connections are so made that when power is supplied in a cross-over manner to the contacts 276 and 277, then while the contacts 275 are connected to a reversible motor 278 as indicated in Fig. 39, the position of the armature 274 determines the relative polarity of the power fed to the armature of the motor 278, and hence by movement of the armature 274 under the influence of either coil 269 or coil 270, the direction of rotation of the motor 278 may be controlled.

With the armature 274 in its central or neutral position, however, the movable contacts 275 make connection with neither the fixed contacts 276 nor the fixed contacts 277, and hence the motor 278 does not operate.

The operation of the circuit of Fig. 39 is as follows: The sliding contact 266 of resistor or potentiometer 267 is set at such a position that no current flows through either of the coils 269 or 270 when the web alignment is correct, and, therefore, under this condition the armature 274 is in a neutral position and the movable contacts 275 do not connect with either of the fixed contacts 276 or the fixed contacts 277. This is true because the voltage drop across the resistor 265 is opposed by an equal voltage drop applied by the potentiometer 267 and battery 268 in combination. If, now, the web W wanders to the left, looking in the direction of travel of the web, and the condition of Fig. 37 is observed, then the voltage drop across the resistor 265 becomes less than the voltage supplied by the potentiometer 267 and current flows through the rectifier 273 and coil 270 and consequently the armature 274 is drawn over so that the movable contacts 275 connect with the fixed contacts 277, and the armature of the motor 278 thus receives power and rotates in one direction.

If, on the other hand, the web W wanders to the right, and the condition observed in Fig. 38 is observed, then the voltage drop across the resistor 265 is greater than the voltage supplied by the potentiometer 267 and current flows through the rectifier 272 and coil 269 and consequently the armature 274 is drawn over so that the movable contacts 275 connect with the fixed contacts 276 and power is supplied to the motor armature to enable it to rotate in a reverse direction. The magnitude of the voltage drop across the resistor 265 is determined by the magnitude of the alternating current voltage drop appearing across the resistor 262 as a result of the reception of modulated light by the photoelectric cell 256 and, therefore, the position of the armature 274 is determined by the magnitude of the light modulation and hence by the distance apart of the center-lines of the spots 17 and of the images 259 of the apertures 258 in mask 257. It is seen, therefore, that when the web W is correctly aligned, the armature 274 of relay 271 is in a neutral position, but should the web W wander laterally in one direction or the other the armature 274 moves in one or another of two directions and supplies power to the armature of the motor 278 to make it rotate in one or the other direction.

In this embodiment of the invention of Fig. 39 it is important that the voltage drop across the resistor 265 be independent of the speed of travel of the web W and this fact should be taken into consideration in the design of the amplifier 263. Also, it is apparent that the lateral wandering is limited by the width of the row of images 259 and, therefore, this embodiment is intended primarily for application to cases in which great wandering does not occur.

The word "web," as used herein, is meant to be inclusive of sheet-like material of any and all compositions. For example, the web may comprise paper, cloth, "Cellophane," metallic foils, rubber sheets, and the like.

The term "photoelectric cell," as used herein, is meant to be inclusive of any and all photosensitive or other radiation detecting devices, such as the so-called soft or gas-filled tubes, the so-called "electron multiplier" tubes, bolometers, "photolytic" cells, selenium cells, and like devices.

It may here be pointed out that photosensitive devices are essentially detectors of radiation. Thus, the radiations usable in the present invention are not confined to visible light rays, but may include infra-red rays and ultra-violet rays, providing these radiations are not harmful to the material of the web, and provided suitable radiation detectors are used. All of such radiations are comprehended to be within the scope of the term "light" as herein used.

Some of the apparatus herein described is claimed in the United States Patent of Donald C. Stockbarger, No. 2,203,706, dated June 11, 1940, for Method of and apparatus for maintaining web alignment; in the application of John L. Jones, Serial No. 140,998, filed May 5, 1937, for United States Patent on Apparatus for detecting web alignment, eventuated as Patent 2,220,737, dated November 5, 1940; and in the application of John L. Jones, Serial No. 356,591, filed September 13, 1940, for United States patent on Compensating roll drive mechanism.

In all of the description heretofore given, the invention has been related to printing presses and their control. However, it has been intimated that the control systems of the invention are applicable to other machinery than printing presses.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. In an alignment detector for use in connection with a moving web which carries thereon a row of periodically repeating pattern bands of uniform spacing, said bands having different light reflective and/or transmissive characteristics than the surrounding portions of the web, the provision of a plurality of optical systems effecting elongated light images parallel to the bands on the moving web, said optical systems comprising light sources with elongated filaments and focusing means between the filaments and the web, and photoelectric means responsive to the difference in effect between coincidence and non-coincidence of said image with respect to said pattern bands, the distances between the images being equal to the distance between a certain plurality of said bands.

2. In an alignment detector for use in connection with a moving web which carries thereon a row of periodically repeating pattern bands of uniform spacing, said bands having different light reflective and/or transmissive characteristics than the surrounding portions of the web, the provision of a plurality of optical systems providing elongated light images parallel to the bands on the moving web, single photoelectric means responsive to the difference in effect between coincidence and noncoincidence of said images with respect to said pattern bands, the distances between the images being equal to the distance between a predetermined plurality of said bands, and a control circuit responsive at all times to impulse from said photoelectric means.

3. In an alignment detector, a moving web which carries thereon repeating groups of rows of printed bands of uniform spacing, said bands having different light reflective and/or transmissive characteristics than the surrounding portions of the web, said groups having blank spaces therebetween, an optical system providing at least two light images on the moving web, the distance between the images being equal to the distance between a predetermined plurality of said bands and greater than the blank space between said groups, and photoelectric means responsive to the difference in effect between coincidence and noncoincidence of said images with respect to said pattern bands.

4. In an alignment detector, a moving web which carries thereon repeating groups of rows of printed bands of uniform spacing ultimately to form pages according to said groups, said bands individually having different light reflective and/or transmissive characteristics than the surrounding portions of the web, said groups having blank spaces therebetween where page separation is ultimately effected, an optical system providing at least two light images on the moving web, the distance between the images being equal to the distance between a predetermined plurality of said bands and greater than the blank space between said groups, and photoelectric means responsive to the difference in effect between coincidence and noncoincidence of either of said images or both with respect to said pattern bands.

5. In an alignment detector, a moving web which carries thereon repeating groups of printed lines of words of uniform spacing between lines, said groups forming the substance of pages to be cut from the web and respectively carrying the wording of said groups, said bands individually having different light reflective and/or transmissive characteristics than the surrounding portions of the web, said groups having blank spaces therebetween providing for page separation, an optical system providing at least two light images on the moving web, the distance between the images being equal to the distance between a predetermined plurality of said lines of words and greater than the blank space between said page groups, and photoelectric means responsive to the difference in effect between coincidence and non-coincidence of either or both of said images with respect to said lines of words.

6. In an alignment detector, a moving web which carries thereon repeating groups of rows of printed bands of uniform spacing, said bands having different light reflective and/or transmissive characteristics than the surrounding portions of the web, said groups having blank spaces therebetween, an optical system providing at least two light images on the moving web, the distance between the images being equal to the distance between a predetermined plurality of said individual bands and greater than the blank space between said groups, a single photoelectric eye, a second optical system simultaneously transmitting to said eye the light effects caused by coincidence and non-coincidence of each of said images with respect to said pattern bands.

DONALD C. STOCKBARGER.
JOHN L. JONES.